Aug. 20, 1940.                R. D. SHAW                2,212,407
                TRACER CONTROLLED MILLING MACHINE
                Filed April 8, 1938        3 Sheets-Sheet 1
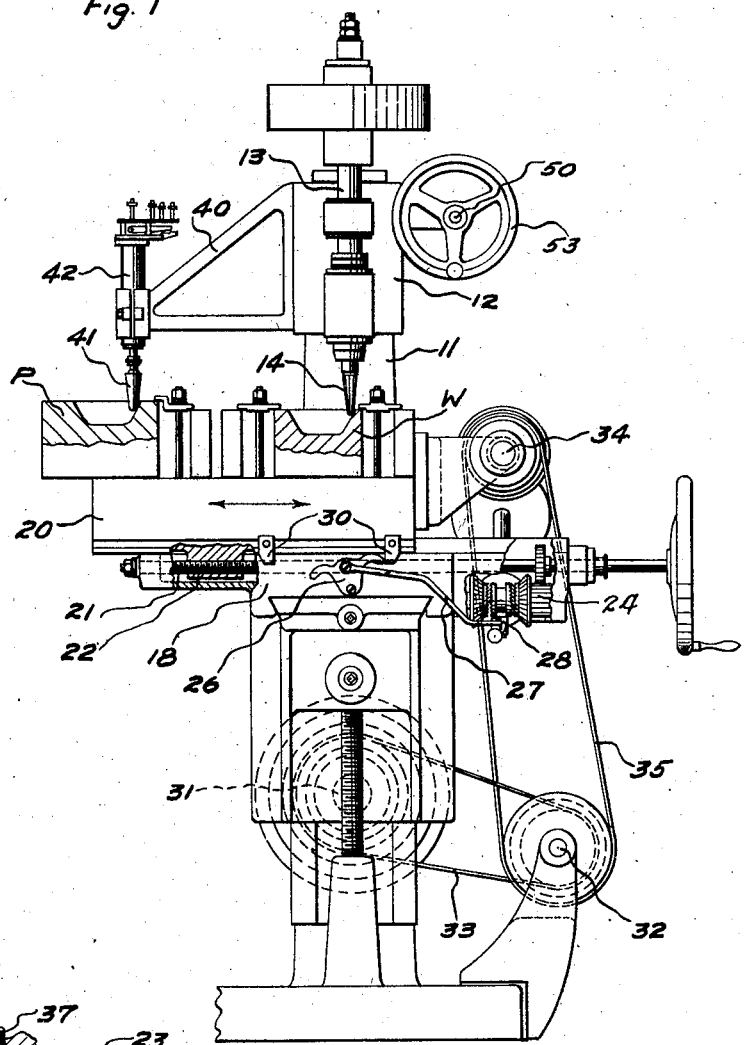
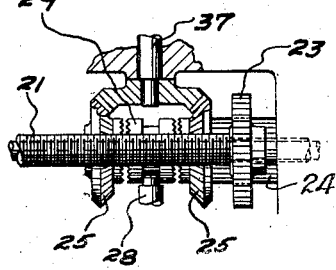
INVENTOR
R. D. SHAW
BY Joseph J. Schofield
ATTORNEY Aug. 20, 1940.   R. D. SHAW   2,212,407
TRACER CONTROLLED MILLING MACHINE
Filed April 8, 1938   3 Sheets-Sheet 3
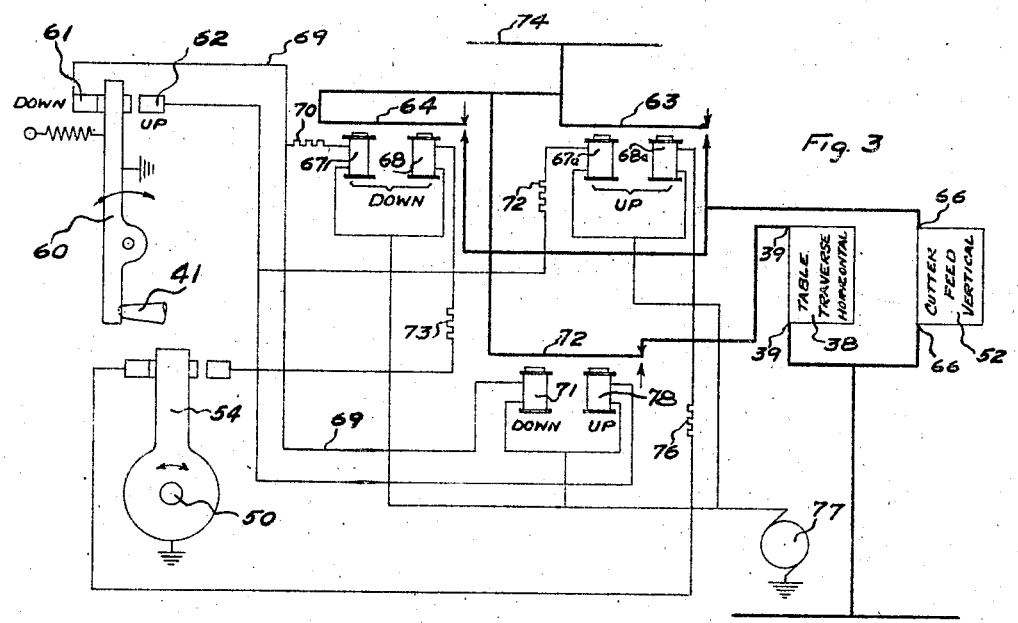
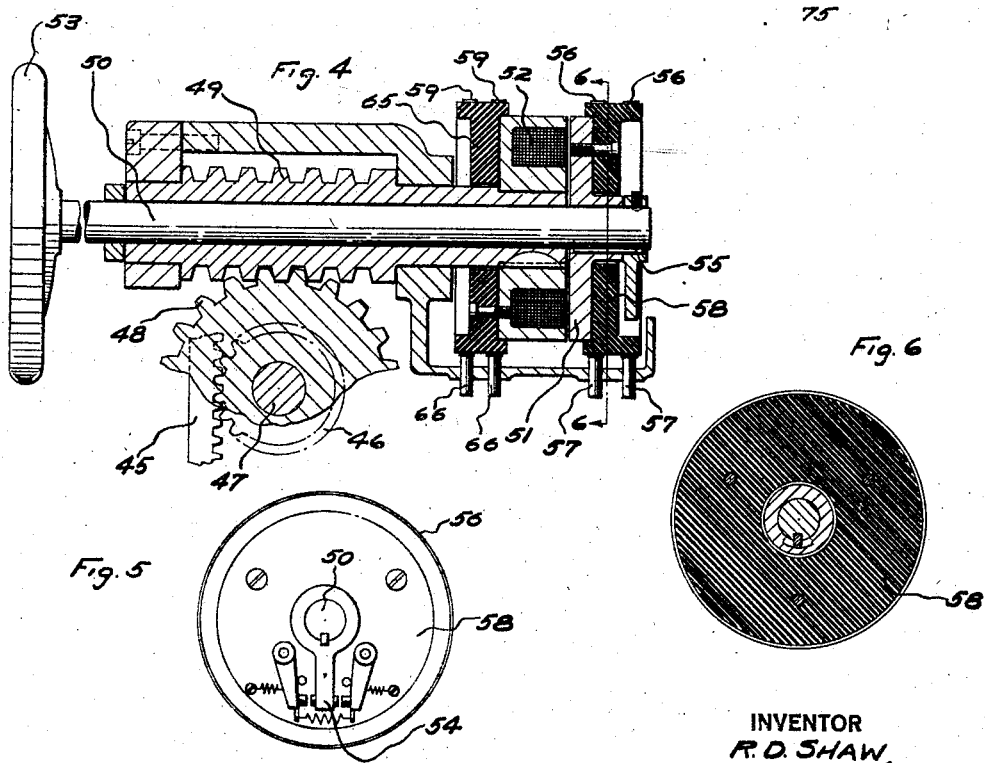
INVENTOR
R. D. SHAW
BY Joseph H. Schofield
ATTORNEY Patented Aug. 20, 1940

2,212,407

UNITED STATES PATENT OFFICE 2,212,407

TRACER CONTROLLED MILLING MACHINE

Robert D. Shaw, Bloomfield, Conn., assignor to Niles-Bement-Pond Company, Hartford, Conn., a corporation of New Jersey Application April 8, 1938, Serial No. 200,944

9 Claims. (Cl. 90—13.5)

This invention relates to a tracer controlled copying milling machine and particularly to a device which may be applied to or incorporated in a standard form of vertical spindle milling machine in order that irregularly shaped members such as forging dies, etc., may be milled in conformity with a pattern or model.

An object of the invention is to provide a tracer controlled feed engaging mechanism so that the milling cutter may be moved into and out of the work piece by contact of the tracer with portions of the pattern as called for by variations in the form of the work piece being milled.

One feature which enables me to accomplish the above named object is that the feed mechanism for the cutter operates through a suitable electro-magnetic clutch energized by circuits controlled partly by contact of the tracer with the pattern and also partly by contacts closed by manual movement of the feed operating means so that the cutter can be moved only when the tracer closes one of its contacts and simultaneously one of the contacts of the feed mechanism is manually closed. Similarly another feature is that the transverse movements of the model and work carrying table are controlled by means of an electro-magnetic clutch so that the transverse movements of the table in either direction may be stopped or started by interrupting or energizing this magnet, the circuit for the magnet being controlled by contacts opened and closed by the tracer passing over with the pattern.

Another advantage and object of the present invention is that a standard vertical spindle milling machine may be adapted for die sinking and other copying operations by the addition of a tracer and electro-magnets thereto, the moving of the tool toward or from the work being effected by manually operated means but being possible only when a magnet is energized, this magnet being energized or deenergized by its circuit being closed or opened by the tracer coming into or leaving contact with the model and by simultaneously manually closing a branch circuit, this branch circuit being one of two similar circuits closed by movement of the feed operating means in one or the other direction.

Another feature of importance is that a standard form of electrically controlled tracer may be made use of which is preferably mounted on the machine for movements up and down with the cutter and spaced laterally therefrom, the tracer engaging a pattern spaced laterally relative to the work blank on the milling machine table.

With the above and other objects in view, the invention includes the features of construction and operation set forth in the following specification and illustrated in the accompanying drawings.

In the accompanying drawings annexed hereto and forming a part of this specification, I have shown the invention embodied in a standard belt driven vertical spindle milling machine, but it will be understood that the invention can be otherwise embodied and that the drawings are not to be construed as defining or limiting the scope of the invention, the claims appended to this specification being relied upon for that purpose.

In the drawings:

Figure 1 is a front elevation of a complete machine embodying the present invention, parts being broken away to more clearly show their construction.

Fig. 3 is a wiring diagram of the circuits controlling movements of the tool and stopping and starting movement of the work table.

Fig. 4 is a longitudinal sectional view of the magnetic clutch and connections to the tool operating or feeding mechanism.

Fig. 5 is a view taken from the right-hand end of the shaft for the cutter controlling mechanism shown in Fig. 4.

Fig. 6 is a cross sectional view taken upon the plane of line 6—6 of Fig. 4, and Fig. 7 is a detail plan view of a portion of the table operating mechanism.

Figure 2:
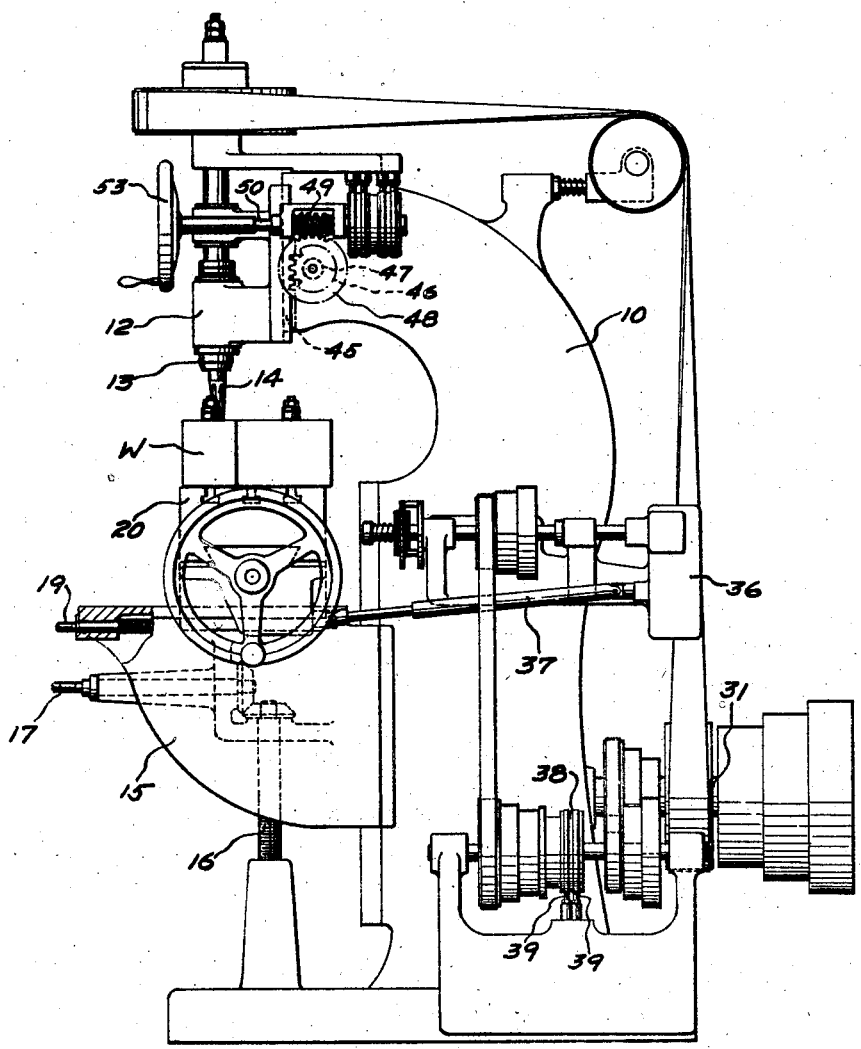
Fig. 2 is a complete side elevation of the machine shown in Fig. 1.

In the above-mentioned drawings there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: first, a machine having a base and column on which a suitable head is mounted for vertical movement; second, a work supporting table movable transversely of the machine in a horizontal plane; third, a cutter spindle rotatably mounted in said head; fourth, a magnetic clutch engaging and rendering operative manually operated feed mechanism for the cutter so that the cutter may be raised or lowered by these manual means when one of two groups of contacts are simultaneously closed; fifth, power operated mechanism for traversing the table adjustable distances in opposite directions below the cutter; sixth, an electromagnetic clutch in the table traversing means so that movement of the table in either direction can be controlled by appropriate electric circuits preferably interlocked with the circuits for the cutter feeding mechanism; and seventh, a pattern following tracer carried by the cutter head so that it will move vertically therewith and having contacts opened and closed by movements of the cutter toward and from the pattern.

Referring more in detail to the figures of the drawings, the present invention is shown embodied in a standard form of vertical milling machine in which a column 10 of a milling machine is provided with vertical ways 11 on which a cutter head 12 is slidably mounted. Rotatably mounted within this head 12 is a belt driven spindle 13 adapted to carry a milling cutter or other form of tool 14 on its lower end. As the means to rotate the cutter spindle 13 and to mount the spindle within the head 12 form no part of the present invention, further description will be unnecessary. The means to manually move the head 12 and the cutter 14 up and down will presently be described.

Mounted on the base or column 10 of the machine is a knee or bracket 15 adjustable manually up or down by rotation of its supporting screw 16 through appropriate connections from the shaft 17 by means of a suitable crank handle thereon. On the upper horizontal surface of this bracket or knee 15 is a saddle 18 movable directly toward and from the column 10 by manual rotation of a screw 19 the forward end of which is squared for application of a suitable crank. Slidably carried by the saddle 18 is an elongated table 20 movable transversely of the bracket 15 and saddle 18 in a horizontal plane below the spindle 13 and cutting tool 14. Mounted on this table 20 in fixed laterally spaced positions thereon are the work piece W and a model or pattern P conforming in shape and size to the form being copied.

Any preferred mechanism may be employed for traversing the table 20 to the left and right as viewed in Fig. 1 between adjustable limits. In the drawings there is shown an elongated screw 21 rotatably mounted within a recess in the saddle 18 and engaging a threaded projection or nut 22 depending from the lower surface of the table 20. Rotation of this screw 21 in opposite directions by a gear 23 at one end in mesh with a gear 24 driven through appropriate connections by one or the other of opposite rotating bevel gears 25 limits and determines the length and direction of the movements of this table 20. In order to effect reversals of the table 20 at predetermined limits, there may be provided an oscillating member 26 connected by an arm 27 to a yoke 28 engaging a central driving clutch member 29. The pivotal member may be oscillated by engagement with one or the other of adjustable studs or dogs 30 outstanding from the front vertical surface of the table 20.

From the above described mechanism, or other standard means, the table 20 may be reciprocated by mechanically operated means. Preferably these means may be driven from a main driving shaft 31 for the machine through appropriate driving connections. Figs. 1 and 2 of the drawings show these connections as including a countershaft 32 driven by a belt 33 from the main shaft, a second countershaft 34 driven from the first countershaft 32 by belt 35, a gear box 36, and a telescoping shaft 37 to the reversing mechanism above described. Through these connections the screw 21 is rotated in opposite directions at appropriate speeds to feed the work W past the cutter during the cutting operation.

At a convenient point in these driving connections for the table traversing screw 21 there may be provided a clutch 38 preferably of the electromagnetic type by means of which movement of the table 20 may be stopped and started at any intermediate points by opening and closing suitable circuits controlling the energizing of this clutch 38 presently to be more fully described. The clutch 38 which constantly rotates during operation of the machine is provided with slip rings of the usual type engaged by contactors 39 forming parts of the circuits controlling the functioning of the machine.

Similarly there may be provided mechanism by means of which appropriate movements of the saddle 18 slight distances either toward or from the column may be effected. These slight step-by-step movements of the saddle 19 take place only at the extreme ends of the transverse movement of the table or at one end only and may be actuated by any standard or usual power or manual means (not shown).

Mounted on the cutter head 12 at one side thereof is a bracket or arm 40 within which may be mounted a tracer. This tracer is or may be in every way similar to that shown in patent to Shaw 1,683,581 at Fig. 16 and has a body portion in the form of a sleeve 42 clamped adjustably to the outer end of arm 40. At its lower end is the model engaging end of the tracer lever 41 mounted within the sleeve 42 at an intermediate point for limited movement in any direction. Movements of this tracer spindle or lever 41, by engagement with the pattern, in any direction from a central or neutral position selectively open and close contacts provided at the upper end of this tracer body and thereby control circuits presently to be more fully described. The tracer in Fig. 1 is shown only in outline, the electrical circuits therefor being shown clearly in the diagram forming Fig. 3.

During the traversing back and forth of the table 20 when operating upon a die, or other irregularly shaped work piece W, the cutter spindle 13 must be raised and lowered to correspond to the particular portion of the surface of the model P being traversed by the tracer point 41. To effect these movements vertically of the cutter spindle 13 and also to stop traversing movement of the table 20 during such movements controls operated by relay circuits opened and closed by movements of the tracer are provided, best shown in Figs. 2 and 4. The closing of one relay circuit enables the cutter to be manually moved in one direction and closing of the other relay enables a cutter movement to be effected manually in the opposite direction. On the rear face of the cutter head 12 is provided a rack 45 engaging with the teeth of a pinion gear 46 mounted on a transverse shaft 47 provided within the column 10. The shaft 47 on which this pinion 46 is mounted is provided at one end with a worm gear 48 engaged by a worm 49. The worm 49 which is in the form of a sleeve is carried upon a shaft 50 mounted in bearings provided upon the side of the machine column 10. An armature in the form of a disc 51 disposed adjacent an electromagnet 52 is mounted on this shaft 50. The shaft 50 also has keyed to it at its forward end a hand wheel 53 and there is mounted at its rear end an arm 54 carrying oppositely disposed electric contacts. Rotation of the hand wheel 53 when the electromagnet 52 is engaged will cause rotation of the magnet and the worm 49 to which it is attached. Rotation of the worm 49 will therefore raise or lower the cutter 14 depending upon the direction of rotation of the hand wheel 53.

The arm 54 is secured to the shaft 50 in fixed position thereto so that very slight movement of the shaft 50 in either direction will close one of the contacts on arm 54. As will be seen in Fig. 6, the shaft 50 carrying the arm 54 is permitted a considerable angular movement with the arm 54 prior to engagement with and oscillation of the armature disc 51. The recess in the central hole of the armature 51 for its key 55 on shaft 50, being of greater width than the key, permits the shaft 50 and contact arm 54 to be oscillated by manual movement of the hand wheel 53 limited distances before effecting oscillatory movement of the disc 51. This movement of the arm 54 is sufficient to close one or the other of the relay circuit contacts carried on the rear face of the insulated disc 58 mounted on the armature 51. These contacts may be opened and closed individually and selectively by oscillating the shaft 50 without forcing the disc 58 to oscillate. The disc 58 formed of insulation or non-conducting material carried by armature 51 has slip rings 56 extending around its circumference and which are engaged by contactors 57 referred to more in detail in connection with the diagram of wiring connections shown in Fig. 3. The electromagnet 52 is supplied with current from slip rings 59 mounted upon the circumference of an insulated disc 65 secured to and rotating with the magnet coil 52. Contactors 66 presently to be referred to constantly engage the slip rings 59.

Referring to the diagram, Fig. 3, the electrical circuits for the electromagnets 38 and 52 by which movement of the table 20 in either direction is stopped and started and the feeding mechanism for the cutter 14 rendered operative will be clear. The upper end of the tracer lever or spindle 41 is shown engaging a conical recess within a pivotally mounted lever 60 movable between two contacts 61 and 62. By means of these contacts 61 and 62 relay circuits are opened and closed which in turn energize or de-energize the electromagnet 52 provided on the feed mechanism depending upon which contact 61 or 62 is closed. Closing of contact 61 enables rotation of the hand wheel 53 to effect movement of the cutter 14 downward while closing of the opposite contact 62 enables the cutter to be moved upward when the appropriate contact on arm 54 is closed. When either of the contacts 61 or 62 is closed, indicating that the cutter requires movement down or up respectively, a relay circuit is closed which opens the circuit for the electromagnetic clutch 38 in the table traversing mechanism so that so long as the cutter 14 is moving up or down the traversing movement of the work W past the cutter 14 is stopped.

The up and down relays 63 and 64 respectively are made to function through the simultaneous closing of tracer contacts 61 or 62 and contacts on the selector switch opened and closed by movement of arm 54. The tracer 41 controls one of the two coils 67 and 68 necessary to be energized to pull down their common armature 64 while the selector switch on arm 54 controls the other coils 67ª and 68ª acting on the armature 63. The tracer 41 is the standard Keller automatic tracer as referred to above, the "in" or "down" and "out" or "up" contacts of this tracer being connected respectively to the coils 67 and 67ª of the "down" and the "up" relays. The wire 69 from tracer contact 61 to coil 67 goes through a resistance 70 to the left hand coil 67 of the "down" relay. This wire 69 also goes directly to the "down" coil 71 of the table stop relay controlling clutch 38. When the "down" contacts of the tracer 41 are closed, as shown, the table stop relay 38 will be open so that the traverse motion of table 20 will be stopped. The resistance 70 is so proportioned that the left hand coil 67 of the relay for downward movement of the cutter 14 has not sufficient energy to pull its armature 64 to its closed position. In the position shown, therefore, the table stop relay is open and as a result the electromagnet 38 for the table traverse motion is de-energized. The left coil 67 of the "down" relay 64 has current flowing but not sufficient energy to close the "down" relay to energize the cutter controlling magnet 52. Now if the hand wheel 53 carrying the selector switch on arm 54 is moved in the direction to move the cutter 14 upward, the selector will be moved to close a circuit which is completed through the right-hand coil 67 of the "up'" relay. Due, however, to the resistance 72 in this circuit there is not sufficient energy to close this "up" relay 63 so that the hand wheel 53, by means of which the selector switch is moved, turns free and does not effect movement of the cutter. By turning the hand wheel 53 and arm 54 in the direction to move the cutter downward, a circuit is completed to the right-hand coil 68 of the "down" relay through the resistance 73. The energy of the right-hand coil 68 added to that of the left-hand coil 67 closes the "down" relay 64 to the cutter controlling magnet 52 and permits the head 12 to be operated downward through the manual connections referred to above. As soon as either the selector circuit through contacts on arm 54 or the tracer circuit through contacts controlled by lever 60 is broken, the "down" relay 64 at once opens. With the magnet 52 controlled jointly by the selector contacts on arm 54 and by the alternately closable tracer contacts 61 or 62 it is only possible to move the cutter 14 in the particular direction called for by the tracer 41. In all cases, however, the tracer 41 alone controls the relay controlling the table traverse clutch 38 as will be seen from the diagram. The resistances 70 and 72 for the relay coils controlled by the tracer 41 and the corresponding resistances 73 and 76 for the relay coils controlled by the selector switch may be adjusted in any usual manner so that no one coil 67—68—67ª or 68ª will close its switch 64 or 63. It is only by both coils of one relay being simultaneously energized that its armature is moved to close its circuits. Movement then of the hand wheel 53 in the direction to keep the same contacts closed will move the cutter up or down as called for by the tracer.

Preferably the circuits for the clutches 38 and 52 are connected to 110 v. lines 74—75 and the relay circuits are connected to a separate source of power at a lower voltage generated by dynamotor 77. A coil 78 similar in every way to coil 71 but connected to the opposite contact 62 opens table relay 72 when upward movement is required of the cutter.

From the above it will be seen that in traversing a pattern or model P the contacts 61 and 62 are individually and repeatedly being opened and closed by contact and disengagement of the tracer 41 relative to the model P. Simultaneously the hand wheel 53 is manually oscillated back and forth a sufficient distance to close the contacts on either side of arm 54. Whenever the direction of motion of the hand wheel 53 is correct for moving the cutter 14 in the direction called for by the tracer the clutch 38 will be energized until movement of the cutter is effected. To again open the tracer contact 61 or 62 the cutter 14 must be moved which correspondingly moves the tracer.

In this manner the entire surface of the model P is traversed by the tracer 41 in closely adjacent back and forth movements controlled by the mechanical table traversing mechanism described above. During these movements of the tracer 41 the cutter similarly traverses the work piece W. Simultaneously the cutter 14 is raised and lowered by the hand wheel 53 and connected means when rendered operative by the momentary energizing of the clutch 52.

What I claim is:

1. A reproducing machine comprising in combination, a base, a table thereon movable in a plane, a work piece and pattern on said table, a cutter spindle mounted for movement in a direction normal to said plane, a pattern following tracer movable with said spindle, manual means to move said spindle toward and from said table, a single magnetic clutch in said spindle moving means, and circuits opened and closed by said tracer controlling the energizing of said clutch and rendering said means operative for moving said spindle in a direction toward or from said table determined by said tracer.

2. A reproducing machine comprising in combination, a base, a table thereon, means for moving said table in a plane on said base, a work piece and pattern on said table, a cutter spindle mounted for movement in a direction normal to said plane, a pattern following tracer movable with said spindle, manual means to move said spindle toward and from said table, a magnetic clutch in said spindle moving means, circuits opened and closed by said tracer for controlling energizing of said clutch, a magnetic clutch in said table moving means, and circuits opened and closed by said tracer for controlling energizing of said last mentioned clutch.

3. A reproducing machine comprising in combination, a base, a work supporting table thereon movable in a plane, a pattern and work piece mounted on said table, a cutter spindle mounted for movement in a direction normal to said plane, a pattern following tracer movable with said spindle, manual means to move said spindle toward and from said table, a single magnetic clutch in said spindle moving means to render said means operative to permit movement of said cutter in opposite directions, and circuits opened and closed by said tracer by engagement with and disengagement from said pattern and controlling energizing of said clutch when said manual moving means are actuated.

4. A reproducing machine comprising in combination, a base, a table thereon movable in a plane, a pattern and work piece mounted on said table, a cutter spindle mounted for movement in a direction normal to said plane, a pattern following tracer movable with said spindle, means to move said spindle toward and from said table, a magnetic clutch in said spindle moving means, a magnetic clutch in said table moving means, circuits opened and closed by said tracer for controlling energizing said table moving clutch, and circuits opened and closed by said tracer and by slight movement of said spindle moving means to energize said spindle moving clutch.

5. A reproducing machine comprising in combination, a base, a table thereon movable in a plane, a pattern and work piece on said table, a cutter spindle mounted for movement in a direction normal to said plane, a pattern following tracer movable with said spindle, means to move said spindle toward and from said table, a magnetic clutch in said spindle moving means, a magnetic clutch in said table moving means, circuits opened and closed by said tracer for controlling energizing said table moving clutch, and circuits opened and closed by said tracer and by slight movement in either direction of said spindle moving means to energize said spindle moving clutch and effect movement of said spindle in either direction.

6. A copying milling machine comprising in combination, a base, a work supporting table thereon movable in directions at right angles to each other in a horizontal plane, a work piece thereon, a work spindle movable in a direction toward and from the plane of movement of said table, a pattern on said table adjacent said work piece, a tracer mounted adjacent and moving with said spindle, means to traverse said table past said spindle, manual means to raise and lower said spindle, a magnet rendering said spindle moving means effective when energized for moving said spindle in one direction, and circuits for said traversing means rendering said traversing means inoperative when the magnet in said spindle moving means is energized.

7. A machine tool comprising in combination, a base, a work support, a tool support, means to move said supports in directions normal to each other, a pattern following tracer movable with one of said supports, circuits controlled thereby operating means for effecting said movements and having electro-magnets therein, said electro-magnets being individually energized to render their respective moving means operative, one of said electro-magnets being energized when one of said moving means is manually actuated in the direction required by the work being machined and when one of said tracer circuits is simultaneously energized, and the other electro-magnet being simultaneously deenergized when the support controlled by the first electro-magnet is moving.

8. A machine tool comprising in combination, a base, a work support, a tool support, means to move one support relative to the other, a template on one of said supports conforming to a portion of the work being formed, a tracer on the other support, and manual operating means for said movable support including an electro-magnet, said electro-magnet being energized to render said moving means operative when one of said moving means is actuated in the direction required by the work being machined and when a contactor is simultaneously closed by engagement of said tracer with said template.

9. A machine tool comprising in combination, a base, a work support, a tool support, means to move said supports in directions normal to each other, a template on one support, a tracer on the other support, circuits closed by said tracer engaging said template, and operating means for said movable supports including an electro-magnet in each means, one of said electro-magnets being energized to render its moving means operative when one of said moving means is manually actuated in the direction required by the work being machined and while said tracer closes one of its circuits, the second electro-magnet being energized when said first electro-magnet is deenergized when said first electro-magnet is energized.

ROBERT D. SHAW.

CERTIFICATE OF CORRECTION.

Patent No. 2,212,407. August 20, 1940.

ROBERT D. SHAW.

It is hereby certified that error appears in the printed specification of the above numbered patent requiring correction as follows: Page 4, second column, line 71, claim 9, before the word "when" insert --and deenergized--; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.